United States Patent
Grieser-Schmitz

(10) Patent No.: US 12,143,050 B2
(45) Date of Patent: Nov. 12, 2024

(54) CONTROL CIRCUIT, CONTROL METHOD, METHOD FOR OPERATING A BRAKE SYSTEM, COMPUTER PROGRAM PRODUCT AND CONTROL UNIT

(71) Applicant: ZF Active Safety GmbH, Koblenz (DE)

(72) Inventor: Stefan Grieser-Schmitz, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 146 days.

(21) Appl. No.: 17/871,224

(22) Filed: Jul. 22, 2022

(65) Prior Publication Data
US 2023/0030062 A1   Feb. 2, 2023

(30) Foreign Application Priority Data
Jul. 29, 2021 (DE) .......................... 102021119716.3

(51) Int. Cl.
| | |
|---|---|
| H02P 3/12 | (2006.01) |
| B60T 8/88 | (2006.01) |
| B60T 8/92 | (2006.01) |
| H02P 3/22 | (2006.01) |
| B60T 13/74 | (2006.01) |

(52) U.S. Cl.
CPC ............... *H02P 3/22* (2013.01); *B60T 8/885* (2013.01); *B60T 8/92* (2013.01); *B60T 13/74* (2013.01); *B60T 2270/406* (2013.01)

(58) Field of Classification Search
CPC ............... H02P 3/22; B60T 8/885; B60T 8/92
USPC .......................................................... 318/379
See application file for complete search history.

(56) References Cited

U.S. PATENT DOCUMENTS

| | | | | |
|---|---|---|---|---|
| 2013/0082514 | A1* | 4/2013 | Murakami | B60T 13/686 303/14 |
| 2013/0184937 | A1* | 7/2013 | Mukai | B62D 6/00 701/41 |
| 2016/0288666 | A1* | 10/2016 | Kim | B60L 58/40 |
| 2018/0082597 | A1* | 3/2018 | Nicol | G08G 5/0043 |
| 2020/0339051 | A1* | 10/2020 | Schill | H01M 10/425 |
| 2022/0105979 | A1* | 4/2022 | Kalapos | H02P 29/027 |

FOREIGN PATENT DOCUMENTS

| | | |
|---|---|---|
| DE | 102013209527 A1 | 11/2014 |
| EP | 2379378 B1 | 1/2014 |
| EP | 3350046 B1 | 10/2019 |

* cited by examiner

*Primary Examiner* — Erick D Glass
(74) *Attorney, Agent, or Firm* — Kristin L. Murphy

(57) ABSTRACT

A control circuit, is disclosed, which is developed and intended for use in a motor vehicle. The control circuit comprises a first circuit portion, which is developed and intended to detect an error state of a control module and/or supply source, such as a voltage supply, of a drive arrangement, for example a drive arrangement of a brake system of the motor vehicle, and/or an electric drive of the drive arrangement, and is developed and intended to cause a short-circuit of the electric drive of the drive arrangement if an error state has been detected. A control method is also disclosed, for operating a brake system of a motor vehicle, as well as a computer program and a control unit or system having multiple control units.

20 Claims, 2 Drawing Sheets

CONTROL CIRCUIT, CONTROL METHOD, METHOD FOR OPERATING A BRAKE SYSTEM, COMPUTER PROGRAM PRODUCT AND CONTROL UNIT

CROSS-REFERENCE TO RELATED APPLICATION

This application claims priority to German Patent Application No. 102021119716.3, filed Jul. 29, 2021, the disclosure of which is incorporated herein by reference in its entirety.

TECHNICAL FIELD

The disclosure relates to a control circuit and a control method. Moreover, the disclosure relates to a method for operating a brake system of a motor vehicle, a computer program product and a control unit and a system comprising multiple control units for a motor vehicle.

BACKGROUND

Vehicle brake systems often comprise electromechanical brake systems (EMB, EMB actuators), electromechanical brake boosters (electronic brake booster, EBB, EBB actuators) or integrated brake systems (IBC, IBC actuators). The energy or auxiliary energy is conventionally generated electrically in order to apply or boost a brake force. Electric motors and actuators are often used here. By way of example, electromechanical brake systems often serve as electronic parking brakes, in which a brake pad is pressed against the brake disc by an electric motor and actuator. In the case of an electromechanical brake booster, the pressure exerted on the master brake cylinder is supported or boosted, wherein the piston of the master brake cylinder is moved by the electric motor and a gear. Such an electromechanical brake booster is known for example from EP 3 350 046 B1 and a method for controlling a brake actuation is known from EP 2 379 378 B1.

In the case of the known control units, a failure or error of the control module or the voltage supply results in the electric drive, such as an electric motor, coming to a stop without braking. Deceleration of the electric drive is then no longer possible. There is therefore a risk that the electric drive will move at a high speed towards its back stop, whereby it even becomes damaged or destroyed. In this case, the majority of the stored energy is converted into a rotational energy of the drive motor rotating with its moment of inertia and at its high rotational speed. Gears are also usually present, which rotate the electric motor in the reverse direction in a mechanically accelerated manner at a high rotational speed. This results in damage or destruction of the mechanics. For example, the electric drive, gearwheels, the rack or the housing may be damaged or even destroyed. This may then result in a failure of the electric drive and the actuators and therefore the brake system.

SUMMARY

The disclosure is based on structurally and/or functionally improving a control circuit mentioned at the outset and a control method mentioned at the outset. Furthermore, the disclosure is based on functionally improving a method mentioned at the outset. Moreover, the disclosure is based on structurally and/or functionally improving a computer program product mentioned at the outset and a control unit or control system mentioned at the outset.

The object is achieved by a control circuit having the features of claim 1 and by a control method having the features of claim 13. Moreover, the object is achieved by a method having the features of claim 14, by a computer program product having the features of claim 17 and a control unit or system having multiple control units having the features of claim 18. Advantageous embodiments and/or developments are the subject matter of the subclaims.

A control circuit may be developed and/or intended for use in a motor vehicle. The control circuit may be developed and/or intended for use in a brake system of a motor vehicle. The brake system may be a motor vehicle brake system. The motor vehicle may be a car or a heavy goods vehicle. The control circuit may be a protective circuit.

The motor vehicle may have a drive arrangement. The brake system may comprise a drive arrangement, for example for applying and/or boosting a brake force. The motor vehicle and/or the brake system and/or the drive arrangement may comprise the control circuit. The control circuit may be developed and/or intended for use in the drive arrangement. The motor vehicle and/or the brake system and/or the drive arrangement and/or the control circuit may have a control module and/or a supply source. The supply source may be a voltage supply and/or a current supply. The supply source may be the supply source of the brake system and/or the drive arrangement and/or an electric drive of the drive arrangement. The supply source may be the supply source of the control circuit.

The drive arrangement may be designed to drive at least one actuating device which is designed to actuate a hydraulic pressure generator. The brake system may comprise the hydraulic pressure generator. The brake system may comprise the actuating device. The drive arrangement may be designed to build up a brake force, which acts on a brake disc of the brake system, by pressing the brake pad against a brake disc. The brake system may comprise at least one wheel brake. The drive arrangement may be part of the wheel brake. The wheel brake and/or the drive arrangement may be a parking brake device, for example an electric parking brake (EPB) or a part thereof. The drive arrangement and/or electric parking brake may be designed to continuously provide a brake force, in particular if the vehicle is temporarily in a stationary state, for example in a parked state or for a hill start. The electric parking brake may be designed to hold and/or mechanically fix the drive arrangement and/or a wheel brake piston in a brake-force-generating position. Instead of the term "wheel", the term "tyre" may be used above and/or below. The brake system may have a functional unit. The functional unit may have a brake pedal which can be actuated by a driver of the vehicle. The functional unit may have the hydraulic pressure generator. The functional unit may have the drive arrangement.

The hydraulic pressure generator may be, for example, operatively, such as mechanically and/or electrically, coupled to the brake pedal. The hydraulic pressure generator may be designed to build up a hydraulic pressure on the at least one wheel brake. The at least one wheel brake may be hydraulically actuable. The hydraulic pressure generator may be designed to build up a hydraulic pressure on multiple, for example two, three or four, wheel brakes The hydraulic pressure may be a hydraulic fluid pressure and/or brake pressure. The hydraulic pressure generator may comprise or be a brake cylinder. The brake cylinder may be a master brake cylinder, for example a tandem master brake cylinder. The brake cylinder may be operatively, for example mechanically and/or electrically, coupled to the brake pedal. The brake system and/or the hydraulic pressure generator may have a hydraulic fluid reservoir. The hydraulic pressure generator and/or the brake cylinder may have a piston, such as an input piston, master cylinder piston, master brake cylinder piston or master cylinder tandem piston. The brake pedal may be designed to mechanically actuate the brake cylinder and/or piston. The piston may be a tandem piston. The piston may be operatively, for example mechanically and/or electrically, coupled to the brake pedal. The brake cylinder of the hydraulic pressure generator may have a pressure chamber. The piston may be mounted in the pressure chamber. Via a displacement of the piston in the pressure chamber of the brake cylinder, the hydraulic pressure in the pressure chamber and/or the pressure in fluid lines which are in communication, or can be brought into communication, with the pressure chamber may be altered. The pressure chamber may be or become fluidically coupled to one or more wheel brakes. The hydraulic pressure in the pressure chamber may be transferred to the one or more wheel brakes as a brake pressure.

The drive arrangement may be, for example, operatively, such as mechanically and/or electrically, coupled to the brake pedal. The drive arrangement may comprise an actuating element, which is designed to maintain a brake force acting on a brake disc of a wheel brake in that the actuating element presses a brake pad and/or friction pad against the brake disc. The drive arrangement and/or electric parking brake may have a corresponding brake shoe. The drive arrangement may be designed to actuate the brake pad and/or friction pad or the brake shoe in such a way that a tensioning force is exerted against the brake disc and/or a parking state is brought about thereby. The brake disc may be non-rotatably connected to an axle of the motor vehicle and/or a vehicle wheel. The brake shoe may press against the brake disc via at least one brake pad fastened thereto.

The drive arrangement may have the electric drive. The electric drive may be designed to apply and/or boost a brake force. The drive arrangement and/or the electric drive thereof may be designed to be self-releasing. The electric drive may be and/or comprise at least one electric motor and/or at least one electric synchronous machine, such as a permanent-magnet synchronous machine (PMSM). The electric motor may be a brushless electric motor. The electric motor may be a direct current motor. For example, the electric motor may be a brushless direct current motor (BLDC motor). The electric drive may have two or three electrical connections. The electric drive may have two or three phases. Each of the electrical connections of the electric drive may be associated with one phase of the electric drive and/or a supply source, such as a voltage source and/or current source and/or supply voltage and/or supply current. A first electrical connection of the electric drive may be associated with a first phase. A second electrical connection of the electric drive may be associated with a second phase. A third electrical connection of the electric drive may be associated with a third phase. The electrical connections of the electric drive may be supply connections and/or voltage connections and/or current connections.

The drive arrangement may have at least one gear. The gear may have multiple gearwheels. The gear may be designed to couple the electric drive to the at least one actuating device. The gear may be designed to couple the electric drive to the actuating element. The gear may be or become coupled to the at least one actuating device or to the actuating element. The at least one actuating device may be or become indirectly or directly coupled to the hydraulic pressure generator, for example to the piston of the hydraulic pressure generator. The drive arrangement may be designed to displace or to move the piston, for example upon manual and/or automatic activation of a braking procedure and/or vehicle-stopping function and/or during the braking operation of the motor vehicle. The piston which can be displaced or moved by means of the drive arrangement may be a master cylinder piston, such as a master brake cylinder piston, or a piston which is indirectly or directly coupled or couplable to the master cylinder piston. The indirect action may take place for example in a hydraulic manner in that the gear acts on a plunger arrangement whereof the output may be hydraulically coupled to an input of the brake cylinder. The drive arrangement may be an electromechanical brake booster (electronic brake booster, EBB, EBB actuator) or a part thereof. The drive arrangement may be designed to actuate the brake pad and/or friction pad or brake shoe by means of the electric drive and/or the actuating element in such a way that a tensioning force is exerted against the brake disc and/or a parking state is brought about thereby. The drive arrangement may be an electromechanical brake actuator and/or an electromechanical brake system (EMB, EMB actuator) or a part thereof.

The drive arrangement may be an integrated brake system (IBS, IBC) or a part thereof. The drive arrangement may have an actuator and an electric motor as an electric drive. The actuating element and the electric drive may be an actuator or may form the actuator. The actuating device and the electric drive may be an actuator or may form the actuator. The drive arrangement may be an electronic brake actuator.

The brake system may have a wheel-brake-pressure regulating device. The wheel-brake-pressure regulating device may be designed to carry out regulating interventions on the at least one wheel brake of the motor vehicle. The wheel-brake-pressure regulating device may be designed to regulate the hydraulic pressure and/or brake pressure on one or more wheel brakes via a brief successive sequence of pressure-maintaining, pressure-build-up and/or pressure-decreasing phases, for example in order to prevent a locking or spinning of one or more wheels of the vehicle. The brake system and/or the wheel-brake-pressure regulating device may have one or more valve arrangements/valves and/or pump devices/pumps. The wheel-brake-pressure regulating device may have a hydraulic fluid reservoir.

The brake system may comprise a vehicle-dynamics regulating system, for example an anti-lock brake system (ABS) and/or an electronic stability program (ESP or ESC, electronic stability control). The vehicle-dynamics regulating system may comprise one or more functions, such as anti-slip regulation (ASR), an anti-lock brake system (ABS) and/or an electronic brake force distribution (EBV). The brake system may comprise a traction control system (TC). The brake system may be fitted as a brake-by-wire system (BBW system) and/or designed as such. The drive arrangement may be part of the brake-by-wire system. In the case of the BBW system, the actual brake force, such as the service brake force, may be generated by means of the drive arrangement. The brake pedal in the BBW system may be mechanically uncoupled from the piston, for example. The mechanical uncoupling may be overridden by means of a push-through device (PT system), for example in the event of an error of the BBW system. The brake system may be fitted with an electric brake boost system (EBB system) and/or designed as such. The drive arrangement and/or the hydraulic pressure generator may be part of the electric brake boost system. In the case of the EBB system, the force applied to the brake pedal by the driver may be boosted by means of the drive arrangement. The wheel-brake-pressure regulating device may be and/or comprise a vehicle safety system and/or vehicle dynamics regulating system, for example an ABS and/or TC and/or ESC regulating device.

The control circuit may comprise a first circuit portion. The first circuit portion may be developed and/or intended to detect an error state of the control module and/or the supply source, such as a voltage supply, of the drive arrangement, for example the drive arrangement of the brake system of the motor vehicle, and/or the electric drive of the drive arrangement. The error state may be an error state, for example an error signal and/or failure, of the control module. The error state may be an error state, for example an error signal and/or a failure, of the supply source of the drive arrangement and/or the supply source of the electric drive of the drive arrangement. The error state may be an error state, for example an error signal and/or failure, of the drive arrangement. The error state may be an error state, for example an error signal and/or failure, of the electric drive of the drive arrangement.

The first circuit portion may be developed and/or intended to cause a short-circuit of the electric drive of the drive arrangement, in particular if an error state has been detected. The first circuit portion may be developed and/or intended to directly/immediately induce the short-circuit of the electric drive of the drive arrangement. The first circuit portion may be developed and/or intended to induce the short-circuit of the electric drive of the drive arrangement by short-circuiting the connections, such as electrical connections, and/or phases of the electric drive. The first circuit portion may be developed and/or intended to induce the short-circuit of the electric drive of the drive arrangement in the voltage-free state and/or current-free state and/or operating state of the electric drive. The control circuit and/or the first circuit portion may be developed and/or intended to induce the short-circuit of the generator voltage of the, for example free-running, electric drive if an error state has been detected. The control circuit and/or the first circuit portion may be developed and/or intended to induce braking, such as deceleration, of the electric drive by the short-circuiting.

The first circuit portion may be developed and/or intended to monitor the control module and/or the supply source of the drive arrangement and/or the supply source of the electric drive and/or the electric drive. The first circuit portion may be developed and/or intended to monitor a signal supplied by the control module and/or by the supply source of the drive arrangement and/or by the supply source of the electric drive and/or by the electric drive. The signal may be a control signal, such as a periodic control signal or periodically supplied control signal. The first circuit portion may be developed and/or intended to detect the error state if the signal has not been supplied and/or is no longer supplied, for example if a periodic control signal is absent.

The first circuit portion may be designed as, and/or comprise, a watchdog or watchdog circuit. The first circuit portion may have one or more transistors, electrical resistors, boosters, capacitors, diodes, relays (e.g. mechanical relays and/or semiconductor relays), FET, BJT, MOSFET, MISFET, JFET and/or IGBT. The first circuit portion may be and/or comprise a transistor circuit and/or booster circuit.

The control circuit may comprise a second circuit portion. The second circuit portion may be developed and/or intended to control and/or operate the electric drive of the drive arrangement, for example directly. The first circuit portion may be connected, such as electrically connected, to the second circuit portion. The second circuit portion may be connected, such as electrically connected, to the electric drive, for example to the electrical connections of the electric drive. The first circuit portion may be developed and/or intended to control the electric drive and/or the second circuit portion. The first circuit portion may be developed and/or intended to control the second circuit portion such that the short-circuit of the electric drive of the drive arrangement is induced.

The second circuit portion may be an output stage, such as a drive output stage or motor output stage, and/or designed as such. The second circuit portion may have at least one driver, such as a low-side driver and/or high-side driver. The first circuit portion may be developed and/or intended to control the at least one driver of the second circuit portion such that the short-circuit of the electric drive of the drive arrangement is induced. The first circuit portion may be developed and/or intended to control all drivers, for example all low-side drivers, of the second circuit portion such that the short-circuit of the electric drive of the drive arrangement is induced.

The first circuit portion may be developed and/or intended to control all drivers, for example all low-side drivers, of the second circuit portion simultaneously so that the short-circuit of the electric drive of the drive arrangement is induced. The first circuit portion may be developed and/or intended to control, for example simultaneously control, the at least one driver or all drivers, for example all low-side drivers, for a specified time period. For example, the first circuit portion may be developed and/or intended to control the at least one driver or all drivers, for example all low-side drivers, of the second circuit portion for a specified time period if an error state has been detected, so that a short-circuit of the electric drive of the drive arrangement is induced.

The low-side driver(s) and/or high-side driver(s) may be and/or form transistor drivers and/or gate drivers. The low-side driver(s) and/or high-side driver(s) may be and/or form low-side switches and/or high-side switches. The second circuit portion may have one or more transistors, electrical resistors, boosters, capacitors, diodes, relays (e.g. mechanical relays and/or semiconductor relays), FET, BJT, MOSFET, MISFET, JFET and/or IGBT. The second circuit portion may be and/or comprise a transistor circuit and/or booster circuit.

The first circuit portion may have at least one uncoupling element. The at least one uncoupling element may be an electrical resistor. The at least one uncoupling element may be connected, such as electrically connected, to the second circuit portion. The at least one uncoupling element may be developed and/or intended to enable a control of the electric drive and/or the second circuit portion via the control module if the control module is intact and/or an error occurs and/or has occurred in the first circuit portion or an error has been detected in the first circuit portion. The at least one uncoupling element may be developed and/or intended to prevent a control of the electric drive and/or the second circuit portion via the first circuit portion if the control module is intact and/or an error occurs and/or has occurred in the first circuit portion or an error has been detected in the first circuit portion. The first circuit portion may have multiple, such as two, three or more, uncoupling elements.

The control circuit may comprise a third circuit portion. The third circuit portion may be developed and/or intended to supply the first circuit portion and/or the second circuit portion electrically, for example with electrical energy. The third circuit portion may be connected, such as electrically connected, to the first circuit portion and/or the second circuit portion. The third circuit portion may be an energy reserve and/or serve as such, for example also in the event of a failure of the supply source. The third circuit portion may have at least one capacitor, at least one battery and/or at least one accumulator. The third circuit portion may be developed and/or intended to provide or supply energy, such as electrical energy, for controlling, in particular temporarily controlling, the second circuit portion or the at least one driver or all drivers, for example all low-side drivers, thereof. The first circuit portion may be developed and/or intended to use or extract the energy provided or supplied by the third circuit portion in order to control the second circuit portion or the at least one driver or all drivers, for example all low-side drivers, thereof, in particular if an error state has been detected.

The control circuit may comprise a fourth circuit portion. The fourth circuit portion may be developed and/or intended to control and/or operate the electric drive of the drive arrangement, in particular in normal operation. The fourth circuit portion may be and/or form the control module. The control module may be part of a control unit or control unit system. The fourth circuit portion may be connected, such as electrically connected, to the first circuit portion. The fourth circuit portion may be developed and/or intended to output a signal and/or supply it to the first circuit portion. The signal may be a control signal, such as a periodic control signal or periodically supplied control signal. The signal may be the signal or control signal described above and/or below, in particular the first circuit portion may detect an error state on the basis of said signal. The fourth circuit portion may be and/or comprise an electronic circuit. The fourth circuit portion may have one or more transistors, electrical resistors, boosters, capacitors, diodes, relays (e.g. mechanical relays and/or semiconductor relays), FET, BJT, MOSFET, MISFET, JFET and/or IGBT.

The control circuit may comprise a fifth circuit portion. The fourth circuit portion may be developed and/or intended to output control signals, in particular control signals for controlling and/or operating the electric drive, and/or supply them to the fifth circuit portion. The fifth circuit portion may be developed and/or intended to boost the control signals of the fourth circuit portion. The fifth circuit portion may be connected, such as electrically connected, to the fourth circuit portion, in particular on the input side. The fifth circuit portion may be connected, such as electrically connected, to the second circuit portion, in particular on the output side. The fifth circuit portion may be and/or comprise a booster circuit and/or transistor circuit. The fifth circuit portion may have at least one booster. The fifth circuit portion may have one or more transistors, electrical resistors, boosters, capacitors, diodes, relays (e.g. mechanical relays and/or semiconductor relays), FET, BJT, MOSFET, MISFET, JFET and/or IGBT. The fifth circuit portion may be and/or form pre-drivers and/or a pre-driver stage. The fourth circuit portion may be developed and/or intended to control the second circuit portion, for example the drivers, such as high-side drivers and/or low-side drivers, thereof via the fifth circuit portion.

A control method may be used in a motor vehicle. The control method may be used in a brake system of a motor vehicle. The control method may be used in a drive arrangement. The control method may be executed by the control circuit described above and/or below. The control circuit may be developed and/or intended to execute the method described above and/or below.

The control method may comprise the step: detecting an error state of the control module and/or supply source, such as a voltage supply of the drive arrangement, and/or the electric drive of the drive arrangement. The error state may be as described above and/or below.

The control method may comprise the step: causing the short-circuit of the electric drive of the drive arrangement if an error state has been detected. The short-circuiting may take place directly/immediately. The short-circuiting may take place as described above and/or below.

A method may be and/or serve for operating a brake system of a motor vehicle. The brake system may comprise a drive arrangement for applying and/or boosting a brake force. The drive arrangement may have an electric drive. The brake system and/or the drive arrangement and/or the electric drive may be designed as described above and/or below.

The method may comprise the step: detecting an error state of a control module and/or a supply source, such as a voltage supply, of the drive arrangement and/or the electric drive thereof. The error state may be as described above and/or below.

The method may comprise the step: short-circuiting the electric drive as soon as or if an error state has been detected. The short-circuiting may take place directly/immediately. The short-circuiting may take place as described above and/or below.

In the case of the method, a failure of the control module and/or a failure of a voltage supply may be detected. The electric drive may be short-circuited as soon as or if the failure of the control module and/or the failure of the voltage supply has been detected.

The short-circuiting may take place by short-circuiting two or three phases and/or two or three electrical connections of the electric drive. The short-circuiting may take place in the voltage-free state and/or current-free state and/or operating state of the electric drive.

The electric drive may be decelerated, for example via the short-circuiting. For example, a movement, such as a backwards movement and/or a movement in the backwards direction may be decelerated. The deceleration may take place fully, such as up to a standstill, or at least partially. The deceleration may take place to a point below a critical speed or acceleration. The current speed and/or current acceleration may be compared to a speed threshold value or acceleration threshold value. The critical speed or acceleration may be or become defined by the speed threshold value or acceleration value.

A computer program may comprise a program code in order to execute the method described above and/or below when the computer program product is executed on a processor. The computer program product may prompt a device, such as a, for example electronic, control and/or a control and/or computing module/unit, a control system, a driver assistance system, a brake system, such as a vehicle brake system, a processor or a computer, to execute the method described above and/or below. The computer program product may prompt the control circuit described above and/or below to execute the method described above and/or below. To this end, the computer program product may have corresponding data sets and/or program code means and/or the computer program and/or a storage medium for storing the data sets or the program.

A control unit or a system comprising multiple control units may be used in a motor vehicle. The motor vehicle and/or the brake system and/or drive arrangement may comprise the control unit or the system comprising multiple control units. The control unit or the system may be developed and/or intended for use in a motor vehicle. The control unit or the system may have an electronic control. The control unit or the system may be or comprise an electronic control unit (ECU). Multiple control units may be provided. The multiple control units may be connected and/or exchange data with one another via a bus system, for example a controller area network (CAN). The electronic control and/or the control unit or system may have a microcomputer and/or processor. The control unit or system may comprise one or more sensors. The control unit or system may comprise the computer program product described above and/or below. The control unit or system may have a memory. The computer program product may be stored in the memory. The control unit or system may be designed to carry out the method described above and/or below. The control unit or system may comprise the control circuit described above and/or below. The control unit or system may comprise the control module described above and/or below. The control unit or system may be and/or form the control module described above and/or below.

In other words, automatic deceleration of an electric drive, such as an electric motor, may take place if a voltage supply or a control module fail. A circuit may be implemented which detects the failure of the control module or the voltage supply. A circuit may be implemented which short-circuits the connections of the electronic drive, such as an electric motor, and thus forces deceleration. A circuit may be implemented which provides an energy reserve for controlling the short-circuited circuit for the braking period. In the event of an error, the electric drive may be decelerated by short-circuiting the connections as it comes to a stop and damage to the actuator may thus be prevented. A control module may control the high- and low-side drivers of the motor output stage and/or transmit a periodic control signal to a watchdog via a pre-driver/pre-driver stage. The pre-driver stage may boost the signals of the control module so that the motor output stage(s) may be controlled. The watchdog may monitor the periodic control signal of the control module and/or, upon detecting an error, control the low-side drivers of the motor output stage for a specified time. The energy reserve may provide energy for temporarily controlling the low-side drivers in the event of an error. Uncoupling elements may prevent the watchdog from being able to execute unwanted braking in the case of an intact control module. The motor output stage may operate the electric drive, such as the motor, directly. In normal operation, the control module may control the motor output stage and/or also initiate deceleration in the event of a shut-down via the pre-driver stage. In the event of a failure of the voltage supply or in the event of an error of the control module, deceleration of the electric motor via the control module is no longer possible. The watchdog may detect this error through the absence of the periodic control signal. The watchdog may then itself initiate deceleration of the electric motor. To this end, the watchdog may control the low-side drivers of the motor output stage for a specified time period. The watchdog may extract the necessary energy for the control from the energy reserve which may be executed as a capacitor. The simultaneous control of all low-side drivers may induce a short-circuit of the generator voltage of the free-running electric motor and therefore a deceleration. The uncoupling elements may be executed as electrical resistors and/or ensure that the motor output stage, in the case of an intact control module, is controlled by this latter and unwanted deceleration as a result of an error in the watchdog can therefore not occur.

By operation of the disclosure, simple, safe and/or cost-effective protection may be provided, in particular against damage and/or destruction of an electric drive, such as an electric motor. Damage and/or destruction of an electric brake or a brake unit or the drive arrangement may be prevented. An uncontrolled backwards striking and/or rapid backwards movement against the back stop of the electric drive may be prevented. Damage or destruction of the drive arrangement and the electric drive thereof and/or the electromechanical brake (EMB), the electromechanical brake booster (EBB) or the integrated brake system (IBC) or parts thereof may be prevented. The safety may be increased, even in the event of a sudden system failure or a failure of the voltage supply. The reliability may be improved.

BRIEF DESCRIPTION OF DRAWINGS

Exemplary arrangements of the disclosure are described in more detail below with reference to figures in which, in a schematic representation and by way of example.

DETAILED DESCRIPTION

Figure 1:
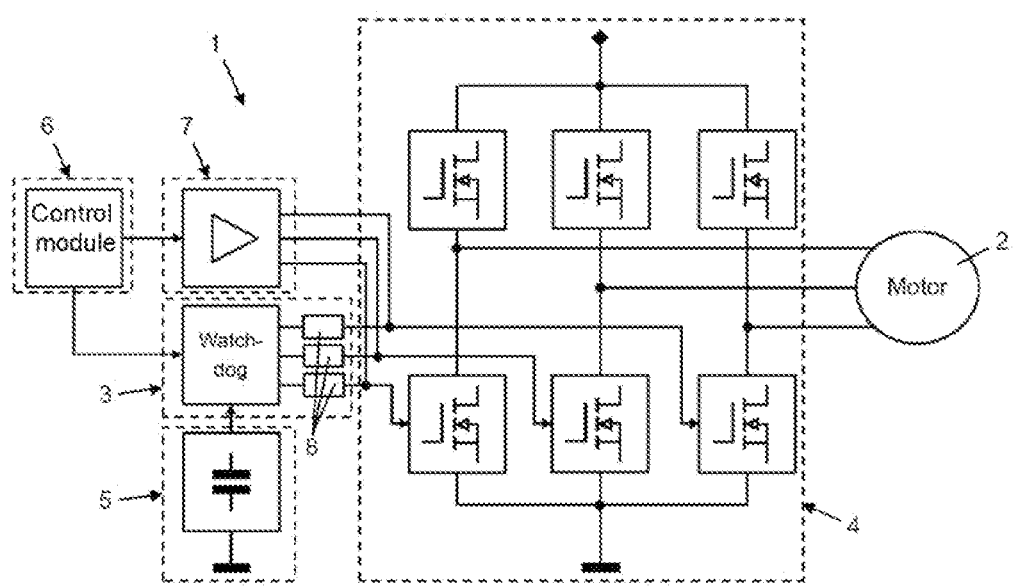
FIG. 1 shows a control circuit.

FIG. 1 shows, in a schematic representation, a block diagram of a control circuit 1, which is developed and intended for use in a motor vehicle. The control circuit 1 may be developed and/or intended to execute the method described above and/or below. The control circuit 1 is electrically connected to an electric drive 2, such as an electric motor, of a drive arrangement. The drive arrangement may be part of a brake system of a motor vehicle.

The control circuit 1 comprises a first circuit portion 3, a second circuit portion 4, a third circuit portion 5, a fourth circuit portion 6 and a fifth circuit portion 7.

The first circuit portion 3 is electrically connected to the second circuit portion 4. The second circuit portion 4 is electrically connected to the electric drive 2 and is developed and intended to control and/or operate the electric drive 2. The second circuit portion 4 has an output stage, such as a motor output stage, and low-side drivers and high-side drivers. The first circuit portion 3 is developed and intended to control all low-side drivers of the second circuit portion 4 for a specified time period.

The third circuit portion 5 is developed and intended to supply the first circuit portion 3 and/or the second circuit portion 4 electrically, in particular with electrical energy.

The fourth circuit portion 6 is designed as a control module and is developed and intended to control and/or operate the electric drive 2 of the drive arrangement in normal operation. The fourth circuit portion 6 is electrically connected to the first circuit portion 3 and to the fifth circuit portion 7. The fourth circuit portion 6 is developed and intended to supply a periodic control signal to the first circuit portion 3 and to supply control signals for controlling and/or operating the electric drive 2 to the fifth circuit portion 7.

The fifth circuit portion 7 is electrically connected to the fourth circuit portion 6 on the input side and to the second circuit portion 4 on the output side. The fifth circuit portion 7 is developed and intended to receive and boost the control signals of the fourth circuit portion 6 so that, in normal operation, the electric drive 2 may be controlled and/or operated by means of the second circuit portion 4.

The first circuit portion 3 is designed as a watchdog circuit and is developed and intended to monitor the control module 6 and/or a supply source, such as a voltage supply, of the drive arrangement and/or the electric drive 2 thereof, in particular the control signal supplied by the control module 6 and/or the supply source of the drive arrangement and/or the electric drive 2 thereof.

The first circuit portion 3 is furthermore developed and intended to detect an error state of the control module 6 and/or the supply source of a drive arrangement and/or the electric drive 2 of the drive arrangement. The first circuit portion 3 detects the error state in particular when the periodic control signal is no longer supplied by the control module 6 or is absent.

The first circuit portion 3 is furthermore developed and intended to cause a short-circuit of the electric drive 2 of the drive arrangement if an error state has been detected. The first circuit portion 3 controls the second circuit portion 4 or all low-side drivers of the second circuit portion 4 simultaneously such that the short-circuit of the electric drive 2 of the drive arrangement is induced. In this case, the electrical connections of the free-running electric drive 2 are short-circuited, whereby a short-circuit of the generator voltage and therefore a deceleration of the electric drive 2 is induced.

The first circuit portion 3 has at least one uncoupling element 8, for example three uncoupling elements 8 here, which is or are developed and intended to enable a control of the electric drive 2 and/or the second circuit portion 4 via the control module 6 if the control module 6 is intact and/or an error occurs in the first circuit portion 3.

Figure 2:
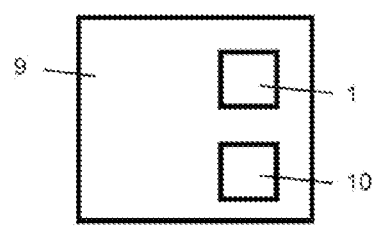
FIG. 2 shows a control unit with a control circuit according to FIG. 1.

FIG. 2 shows, in a schematic representation, a control unit 9, which is developed and intended for use in a motor vehicle. The control unit 9 has a processor 10 and a computer program. The computer program product comprises a program code in order to carry out the method described above and/or below when the computer program product is executed on the processor 10. The control unit 9 furthermore has the control circuit 1.

Moreover, please refer additionally to FIG. 1 in particular and the associated description.

Figure 3:
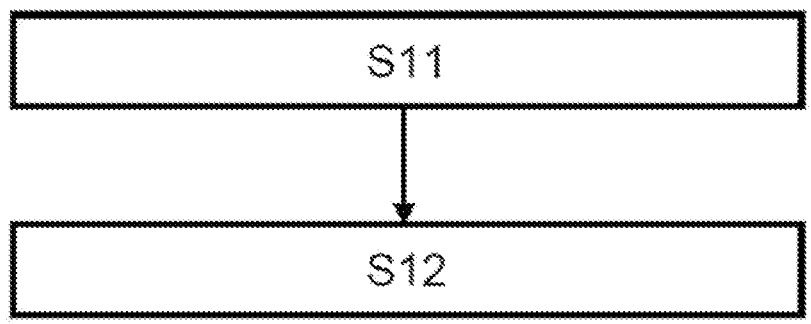
FIG. 3 shows a flow chart of a control method.

FIG. 3 shows a flow chart of a control method. The control method may be used in a motor vehicle. The control method is executed by the control circuit 1 described above and/or below.

In a step S11, an error state of the control module 6 and/or supply source, such as a voltage supply, of the drive arrangement, and/or the electric drive 2 of the drive arrangement is detected.

In a step S12, the short-circuit of the electric drive 2 of the drive arrangement is caused if an error state has been detected.

Moreover, please refer additionally to FIGS. 1 and 2 in particular and the associated description.

Figure 4:
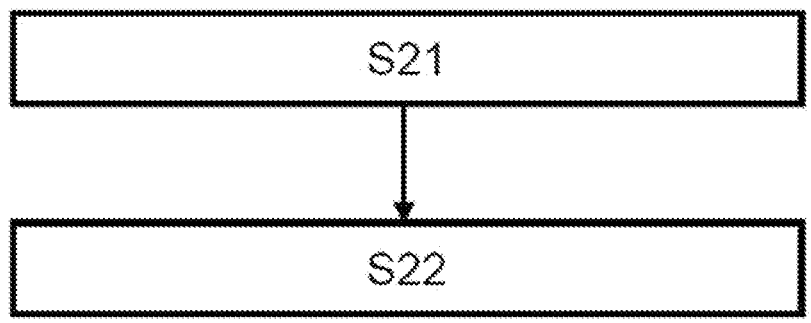
FIG. 4 shows a flow chart of a method for operating a brake system of a motor vehicle.

FIG. 4 shows a flow chart of a method for operating a brake system of a motor vehicle.

The brake system has a drive arrangement for applying and/or boosting a brake force. The drive arrangement has an electric drive 2, such as an electric motor, and a gear. The electric drive 2 may be designed to apply and/or boost the brake force.

In a step S21, an error state of a control module 6 and/or supply source, such as a voltage supply, of the drive arrangement and/or the electric drive 2 thereof is detected.

In a step S22, the electric drive 2 is short-circuited as soon as an error state has been detected.

A failure of the control module 6 and/or a failure of the voltage supply may be detected, wherein the electric drive 2 is short-circuited as soon as the failure of the control module 6 and/or the failure of the voltage supply has been detected.

Two or three phases and/or two or three electrical connections of the electric drive 2 may be short-circuited.

Moreover, please refer additionally to FIGS. 1 to 3 in particular and the associated description.

The word "may" refers in particular to optional features of the invention. Consequently, there are also developments and/or exemplary arrangements of the disclosure which additionally or alternatively have the respective feature or the respective features.

Isolated features may also be extracted as required from the feature combinations disclosed in the present case and, by eliminating a structural and/or functional connection which is possibly present between the features, may be used in combination with other features to define the subject matter of a claim. The sequence and/or number of all steps of the method may be varied.

The invention claimed is:

1. A control circuit in a motor vehicle, comprising:
   a first circuit portion configured to detect an error state of a control module and/or supply source, of a drive arrangement of a brake system of a motor vehicle, and/or an electric drive of the drive arrangement, and is configured to cause a short-circuit of the electric drive of the drive arrangement if the error state is detected.

2. The control circuit according to claim 1, comprising a second circuit portion to control and/or operate the electric drive of the drive arrangement, wherein the first circuit portion is connected to the second circuit portion and wherein the first circuit portion is configured to control the second circuit portion such that the short-circuit of the electric drive of the drive arrangement is induced.

3. The control circuit according to claim 2, wherein the second circuit portion is an output stage and/or has at least one driver, wherein the first circuit portion is configured to control the at least one driver of the second circuit portion such that the short-circuit of the electric drive of the drive arrangement is induced.

4. The control circuit according to claim 3, wherein the first circuit portion is configured to control all drivers of the second circuit portion such that the short-circuit of the electric drive of the drive arrangement is induced.

5. The control circuit according to claim 3, wherein the first circuit portion is configured to control all low-side drivers for a specified time period.

6. The control circuit according to claim 1, wherein the first circuit portion is configured to monitor the control module and/or the supply source of the drive arrangement and/or the electric drive thereof, a signal supplied by the control module and/or the supply source of the drive arrangement and/or the electric drive thereof.

7. The control circuit according to claim 6, wherein the first circuit portion is configured to detect the error state if a periodic control signal is absent.

8. The control circuit according to claim 1, wherein the first circuit portion has at least one uncoupling element, which is configured to enable a control of the electric drive and/or the second circuit portion via the control module if the control module is intact and/or an error occurs in the first circuit portion.

9. The control circuit according to claim 1, wherein a third circuit portion, which is configured to supply the first circuit portion and/or the second circuit portion electrically.

10. The control circuit according to claim 1, wherein a fourth circuit portion, which is configured to control and/or operate the electric drive of the drive arrangement, and/or the fourth circuit portion forms the control module.

11. The control circuit according to claim 10, wherein the fourth circuit portion is connected to the first circuit portion and wherein the fourth circuit portion is configured to supply a control signal to the first circuit portion.

12. The control circuit according to claim 10, comprising a fifth circuit portion, which is configured to boost control signals of the fourth circuit portion, and/or wherein the fifth circuit potion is connected to the fourth circuit portion on one side, and to the second circuit portion on the other side.

13. A control method, which is used in a motor vehicle, wherein the control method is executed by a control circuit according to claim 1 wherein the control method comprises at least the following steps:
- detecting an error state of the control module and/or a voltage supply of the drive arrangement, and/or the electric drive of the drive arrangement; and
- causing the short-circuit of the electric drive of the drive arrangement if an error state has been detected.

14. A method for operating a brake system of a motor vehicle, wherein the brake system comprises a drive arrangement for applying and/or boosting a brake force, wherein the drive arrangement has an electric drive, wherein the method comprises the steps:
- detecting an error state of the control module and/or supply source of the drive arrangement and/or the electric drive thereof;
- short-circuiting the electric drive in response to detecting the error state.

15. The method according to claim 14, wherein the detection of a failure of the control module and/or a failure of a voltage supply, wherein the electric drive is short-circuited as soon as the failure of the control module and/or the failure of the voltage supply has been detected.

16. The method according to claim 14, wherein two or three phases and/or two or three electrical connections of the electric drive are short-circuited.

17. A computer program, comprising a program code to carry out a method according to claim 13, wherein when the computer program product is executed on a processor.

18. A control unit or system comprising multiple control units for a motor vehicle, comprising at least one processor and a control circuit according to claim 1.

19. The control circuit according to claim 11, comprising a fifth circuit portion, which is configured to boost control signals of the fourth circuit portion, and/or wherein the fifth circuit portion is connected to the fourth circuit portion on one side, and to the second circuit portion on the other side.

20. The method according to claim 15 wherein two or three phases and/or two or three electrical connections of the electric drive are short-circuited.

* * * * *